United States Patent [19]

Hart

[11] Patent Number: 5,800,846

[45] Date of Patent: Sep. 1, 1998

[54] TWIN-SHEET THERMOFORMING APPARATUS WITH HYDRAULIC ARRAY MOLD SUPPORT

[75] Inventor: James P. Hart, Portage, Wis.

[73] Assignee: TriEnda Corporation, Portage, Wis.

[21] Appl. No.: 604,787

[22] Filed: Feb. 23, 1996

[51] Int. Cl.$^6$ .................. B29C 51/46; B29C 51/38
[52] U.S. Cl. .................. 425/504; 425/150; 425/342.1; 425/388; 425/451; 425/451.2
[58] Field of Search ........................... 425/150, 156, 425/157, 158, 159, 160, 388, 408, 450.1, 340, 394, 451, 451.2, 342.1, 504, 519

[56] References Cited

U.S. PATENT DOCUMENTS

| | | |
|---|---|---|
| Re. 27,881 | 1/1974 | Brown et al. |
| 3,346,923 | 10/1967 | Brown et al. |
| 3,376,607 | 4/1968 | Brown . |
| 3,398,434 | 8/1968 | Alesi, Jr. et al. |
| 3,496,257 | 2/1970 | Brown et al. |
| 3,504,403 | 4/1970 | Brown et al. |
| 3,583,036 | 6/1971 | Brown . |
| 3,585,689 | 6/1971 | Brown et al. |
| 3,597,799 | 8/1971 | Earle . |
| 3,600,753 | 8/1971 | Otto . |
| 3,669,594 | 6/1972 | Brown et al. |
| 3,677,675 | 7/1972 | Brown . |
| 3,787,158 | 1/1974 | Brown et al. |
| 3,867,088 | 2/1975 | Brown et al. |
| 3,868,209 | 2/1975 | Howell . |
| 3,925,140 | 12/1975 | Brown . |
| 4,147,486 | 4/1979 | Jahnle . |
| 4,244,915 | 1/1981 | Boardman . |
| 4,531,901 | 7/1985 | Andersen . |
| 4,555,377 | 11/1985 | Whiteside et al. |
| 4,764,241 | 8/1988 | Makino . |
| 4,830,596 | 5/1989 | Neu . |
| 4,944,669 | 7/1990 | Zakich . |
| 4,969,812 | 11/1990 | Brown . |
| 5,071,603 | 12/1991 | Kurumaji et al. |
| 5,091,124 | 2/1992 | Zakich . |
| 5,147,661 | 9/1992 | Kurumaji et al. |
| 5,156,782 | 10/1992 | Ballantyne . |
| 5,167,969 | 12/1992 | DeMaio, Jr. et al. |

Primary Examiner—James P. Mackey
Attorney, Agent, or Firm—Lathrop & Clark

[57] ABSTRACT

An upper thermoforming mold is positioned above a lower thermoforming mold on a platen. The platen is provided with an array of position-controlled hydraulic cylinders. A controller drives the array of cylinders to uniformly advance the two molds together once heated sheets of thermoplastic material have been formed thereon. By controlling the position of each actuator, forces may be applied at different levels to the platen to bring about uniform molded parts and reduced deflection of the molds.

6 Claims, 3 Drawing Sheets

TWIN-SHEET THERMOFORMING APPARATUS WITH HYDRAULIC ARRAY MOLD SUPPORT

FIELD OF THE INVENTION

The present invention relates to thermoforming apparatus and methods in particular, and to twin-sheet thermoforming apparatus in particular.

BACKGROUND OF THE INVENTION

Conventional plastic forming methods form plastic parts against stationary or closed mold cavities. In injection molding a closed mold cavity is subjected to a uniform high static load as plastic under high pressure is injected into the mold cavity. In reaction injection molding a thermosetting plastic is injected under pressure into a closed mold cavity. Similarly, in single sheet thermoforming, uniform atmospheric pressure moves a sheet of plastic against a fixed mold.

The high pressures employed in injection and reaction molding can cause problems with mold deflections which can cause distortion in the part, opening of the mold and mold breakage. However, because the basic load is applied uniformly, these problems are usually addressed by building a stronger static mold.

In the conventional twin-sheet thermoforming process heated sheets of thermoplastic material are successively drawn into an upper mold and a lower mold. The two loaded molds are then brought together to join the two heated and formed sheets. This joining has some of the attributes of a forging operation. When the opposed molds and sheets are brought together, high local stresses are produced where the sheets interfere. The interference between the plastic sheets on the upper and lower mold halves causes the plastic to locally deform and flow. This deformation and flow affects both the welding between the upper and lower sheets and causes a displacement of excess material away from the point of interference. This flow takes high local pressures.

In a conventional twin-sheet thermoforming apparatus, the closing forces on the molds are provided by a uniform pneumatic support which supplies the necessary pressure needed to close the mold as a uniform force field provided by a uniformly inflated pneumatic bag or the like. Conventionally, an array of fire hoses is expanded with compressed air to uniformly support a metal platen to which is mounted the lower mold. The platen then applies pressure to close lower mold with the upper mold. However, the uniform applied force is reacted against highly localized stresses produced by the interference of the upper and lower plastic sheets. Thus, in operation, highly localized loads must be balanced against a uniform support provided by the platen. This requires that the mold and the platen act as a lateral beam transmitting and distributing the point loads to be reacted by the uniform applied support. Such distribution of loads, by definition, requires some deflection of the mold and platen to affect the distribution of the loads. Deflection of the mold is undesirable in that it causes distortion in the part and can result in failure of the mold to properly close.

The necessity of using the platen and the mold for distribution of loads, means that any variation in the plastic sheet thickness or sheet temperature changes the forces necessary to close the mold. These changes lead to varying deflections which in turn lead to variability in the part formed which can become a quality control problem.

Furthermore, air bags present significant maintenance problems when used in conjunction with the trying conditions of thermoforming machines. Frequent punctures of the air bags are typical, causing wasted air pressure generation costs and downtime for repair.

What is needed is a method and apparatus for closing twin sheet thermoforming molds without production of deflection in the molds or the supporting platens.

SUMMARY OF THE INVENTION

The apparatus and method of this invention supports one or both of the molds for twin-sheet thermoforming on an array of position-controlled hydraulic pistons. Once the thermoplastic sheets have been formed on the upper and the lower thermoforming molds, a controller causes the hydraulic pistons in the array to advance the molds toward one another. The controller individually instructs the advancement of each piston so that the displacement of the mold plane remains uniform. The pistons are thus supplied with hydraulic fluid to minimize or prevent deflections in the mold or platen when the upper and lower molds are closed. The array of hydraulic pistons positioned beneath the mold or the platen supplies the necessary closing force close to or directly beneath where the loads are produced by the interference of the two sheets of plastic on the opposed molds. Thus, the necessity of the mold and/or the platen to support beam loads is substantially reduced or eliminated.

The thermoforming apparatus of this invention has several advantages. The first is reduction or elimination of deflection in the molds which leads to more uniform parts of higher quality. The second is that the twin sheet thermoforming process is less sensitive to variation in sheet thickness, sheet uniformity and sheet preheating. Such decreased sensitivity to sheet variation can result in faster production cycles, an ability to vary the sheet stock within limits to produce parts of varying strength on the same molds and the production of parts of greater uniformity. Thirdly, the improved method of hydraulic support allows the construction of molds of lower strength and lower cost. The use of a hydraulic support mechanism disclosed herein also increases predictability in the design of twin sheet thermoforming molds. Because a conventional twin sheet thermoforming mold must act as a load supporting structure between the pinch points and the distributed support, and because such load support requirements are not easily calculated, conventional twin sheet thermoforming relies on experience and trial and error to determine the amount of reinforcing and deflection allowance necessary to produce an acceptable twin-sheet thermoformed part.

It is an object of the present invention to provide an apparatus for preventing the deflection of twin-sheet thermoforming molds when they are used to form twin sheet thermoformed parts.

It is another object of the present invention to provide a thermoforming apparatus which is less sensitive to variations in plastic gauge and temperature.

It is a further object of the present invention to provide a twin-sheet thermoforming apparatus which can utilize molds of lower rigidity.

It is a further object of the present invention to provide a twin-sheet thermoforming apparatus which has a faster production cycle.

It is yet another object of the present invention to provide a twin-sheet thermoforming apparats which produces a twin-sheet thermoformed article of higher uniformity.

It is yet another object of the present invention to provide a method of twin-sheet thermoforming which prevents mold deflection when the molds are closed.

Further objects, features and advantages of the invention will be apparent from the following detailed description when taken in conjunction with the accompanying drawings.

DESCRIPTION OF THE PREFERRED EMBODIMENT

Figure 3:
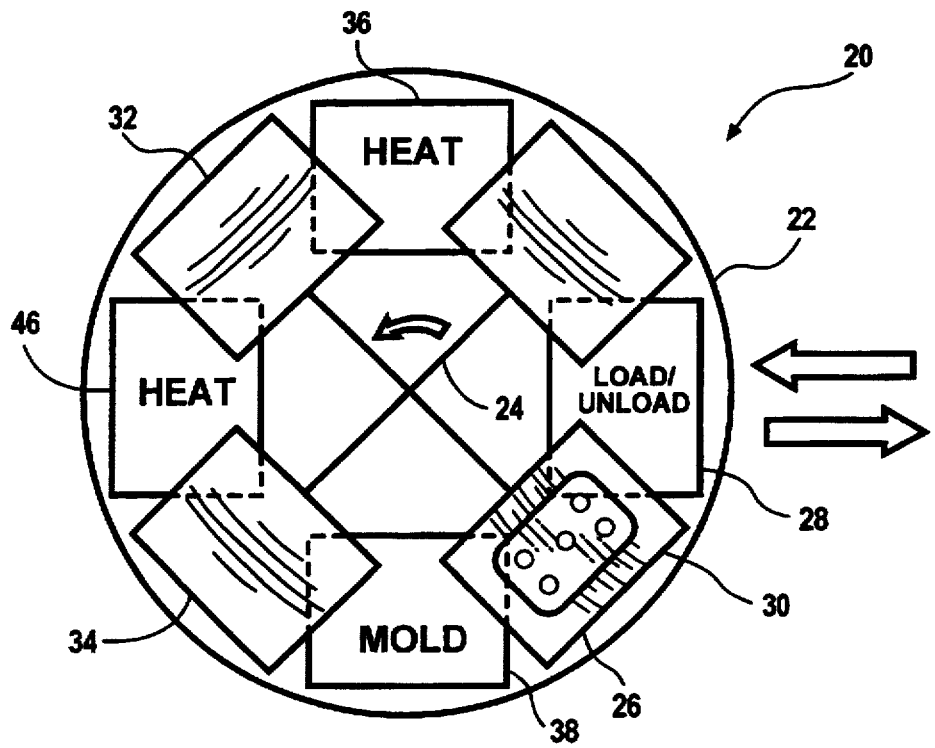
FIG. 3 is a schematic view of the twin-sheet thermoforming apparatus of this invention.

Referring more particularly to FIGS. 1–4, wherein like numbers refer to similar parts, a twin-sheet thermoforming apparatus 20 is shown in FIG. 3. The apparatus 20 is of the rotary thermoformer type, and has a structural frame 22 which is fixed to the factory floor. A carousel 24 is center-mounted for rotary motion to the frame 22, and has four sheet-holding clamping fixtures 26 which releasably grip planar sheets of thermoplastic material. The fixtures 26 rotate individual thermoplastic sheets through the various stations of the thermoforming apparatus 20. An example of a conventional twin-sheet thermoforming apparatus with a center-mounted carousel is disclosed in U.S. Pat. No. 3,868,209, the disclosure of which is incorporated by reference herein. Similar machines are manufactured by John Brown Inc. of Beaverton Mich.

Although the number and location of stations may vary depending on the particular part produced and production requirements, the exemplary apparatus 20, shown in FIG. 3 has four stations. Raw thermoplastic sheets are loaded onto the carousel 24 and molded parts 30 are removed at a load/unload station 28. The upper thermoplastic sheet 32 and the lower thermoplastic sheet 34 are heated at two heating stations 36. The heated thermoplastic sheets 32, 34 are then formed into a molded part 30 at a molding station 38. The load/unload station may employ manual loading and unloading techniques, or may employ robotic or other mechanized means for inserting and removing sheets. The heating stations may be of a conventional type, and preferably will have a plurality of controllable zones, for example twelve, for obtaining heating of the sheets to desired levels of plasticity at required regions.

Figure 1:
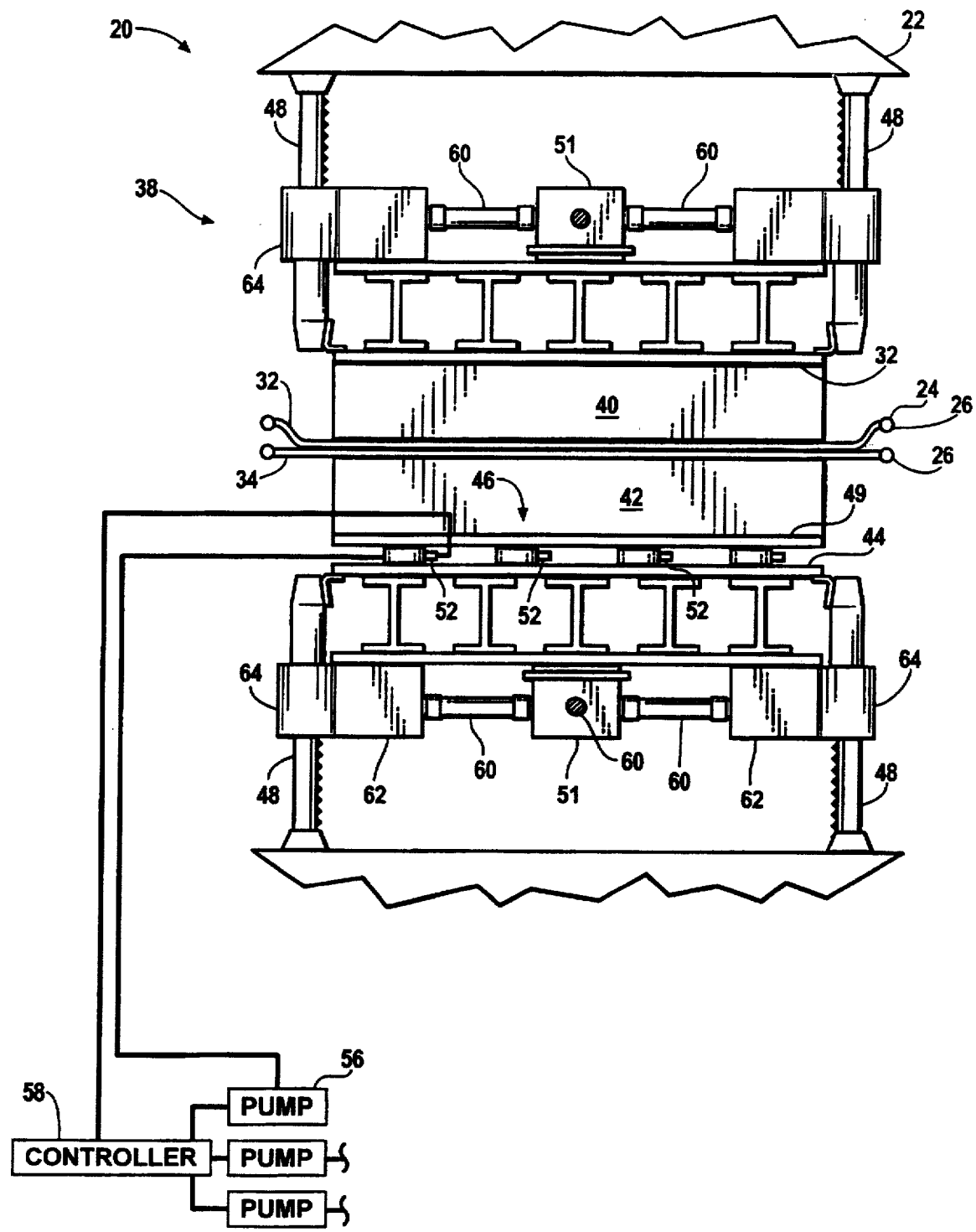
FIG. 1 is side cross-sectional view of the molding station of the twin-sheet thermoforming apparatus of this invention, with control elements shown schematically.
Figure 2:
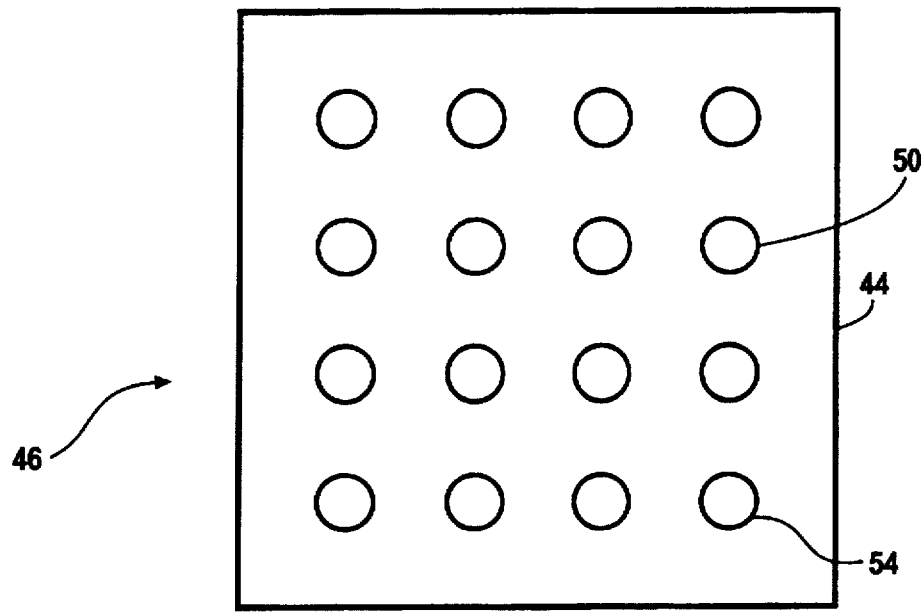
FIG. 2 is a cross-sectional view of the apparatus of FIG. 1 taken along section line 2—2.
Figure 4:
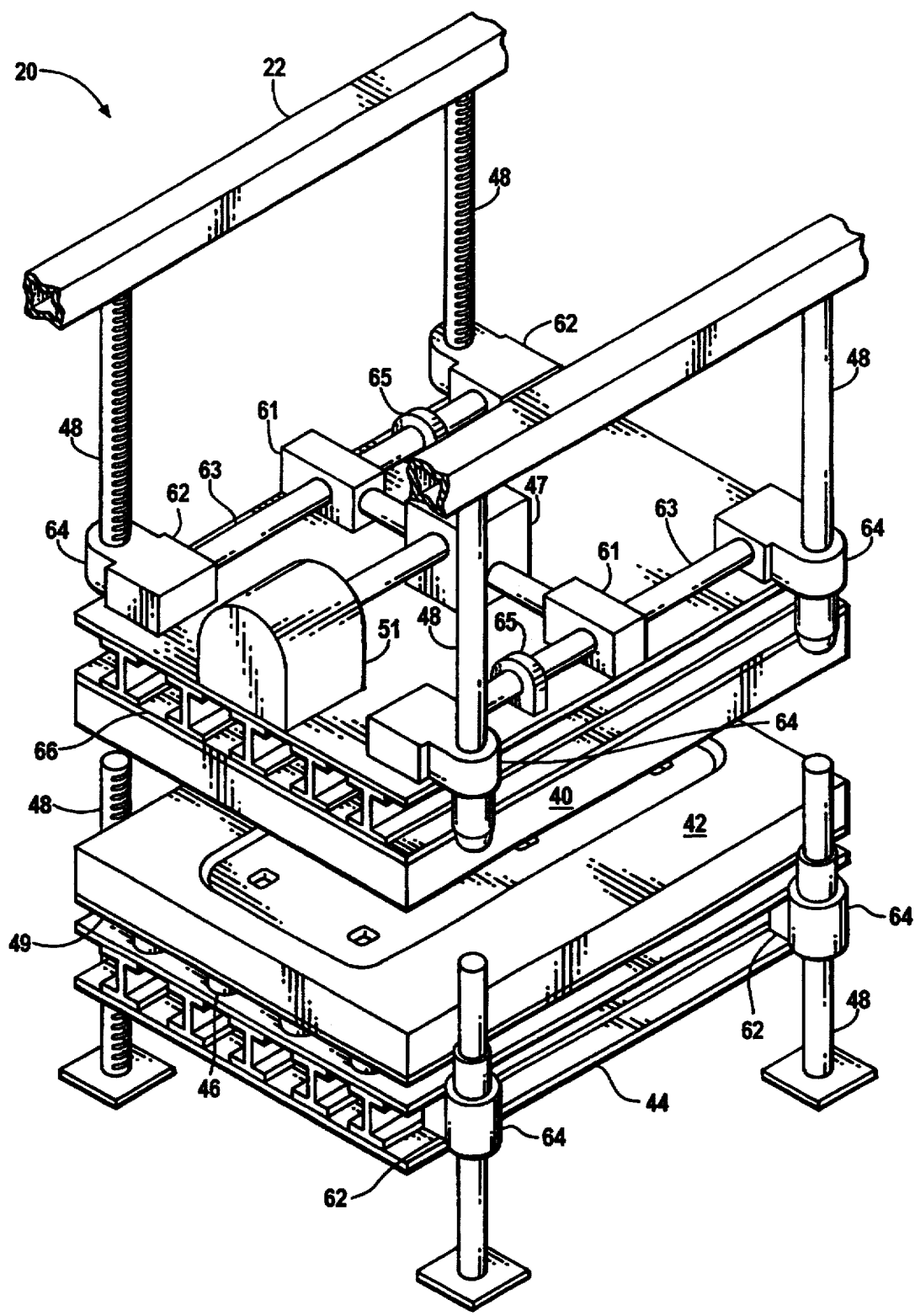
FIG. 4 is an isometric view of the apparatus of FIG. 1.

The molding station 38, as shown in FIG. 1, provides precise control over the closure of the upper thermoforming mold 40 and the lower thermoforming mold 42 to accurately and repeatably produce parts 30. As shown in FIGS. 1 and 4, a rigid lower platen 44 is supported by four upright gear posts 48 on the frame 22. Each gear post is a generally cylindrical member which has gear teeth formed to face the platen 44. A hydraulic motor 51 is connected beneath the lower platen 44, and above the upper platen 66. The hydraulic motor 51 as shown in FIG. 4 has a gear box 47 which drives two cross shafts 60 which connect to right angle gear boxes 61. The right angle gear boxes 61 drive parallel shafts 63 which drive shaft gear boxes 62. The shafts 63 drive gears (not shown) within the gear boxes 62 which engage the gear posts 48. Disk brakes 65 are mounted to the parallel shafts 63 for locking the platens 44, 66. A brake may also be used in connection with the hydraulic motors to positively lock the position of the platen 44, 66.

A bearing 64 extends from each box 62 around the gear post to prevent tipping of the platen 44 with respect to the gear posts. Hence the motor 51 is operable to move the entire platen 44 vertically on the gear posts 48. The gear posts 48 terminate below the level of the closed molds, and hence do not interfere with the introduction of a sheet between the upper and lower molds. When the platen 44 has been advanced to bring a mold into a desired position, friction plates (not shown) are engaged between the platen and the gear posts to lock the platen in position.

An upper platen 66 is mounted to the frame above the lower platen 44 by a similar mechanism. Hence both platens may be positively advanced to bring the upper and lower molds into initial contact.

A rigid steel bolster plate is mounted to the lower platen 44 by an array 46 of hydraulic actuators 50 of the stepper type. The number of actuators 50 may be varied to suit the size of the apparatus and the level of pressure required, but in a preferred embodiment the array 46 consists of four rows of four actuators 50.

The stepper hydraulic actuators are preferably of the type supplied by Olsen Controls having an eight-inch bore and a two-inch stroke. The actuators are supplied with precise quantities of hydraulic fluid by hydraulic gear pumps 56. Each gear pump 56 is controlled by a controller 58. The gear pumps 56 are incremented by the controller 58 to cause a precise and repeatable advancement of the connected actuator 50.

The lower thermoforming mold 42 is locked to the bolster plate 49. Once the molds have been brought together, The actuators 50 in the array 46 are individually supplied with hydraulic fluid by the gear pumps 56. The output of the pumps 56 to each actuator is in precise increments, thus the advancement of the actuators 50 can be precisely controlled, preferably to at least one-thousandth of an inch. Each actuator is be supplied with a conventional position control sensor 52, for example an LVDT (linear variable displacement transducer), which determines the location of the actuator's piston 54 at any time. The controller 58 may be an analog device, but is preferably a digital microprocessor which receives the position data for each piston which is output by the position sensors 52.

In operation thermoplastic sheets are formed on the upper mold and the lower mold, and then the two platens are driven on the gear posts to bring the two molds together. Once together, the controller instructs the pumps to advance the actuators to uniformly bring the two mold halves together. If one portion of the combined molds is more resistant to closure, the controller will detect that adjacent actuator pistons are not being advanced sufficiently, and will halt additional hydraulic fluid to some actuators while continuing to pump in others until a consistent parallel closure of the molds to the desired point is achieved.

It should be noted that although a four station thermoforming apparatus has been disclosed, apparatus having six or more stations, including specialized cooling stations, may be used. It should be further noted that although servo-controlled actuators have been shown between the lower platen and the lower mold only, an identical array of actuators may also be provided between the upper platen and the upper mold.

It is understood that the invention is not limited to the particular construction and arrangement of parts herein illustrated and described, but embraces such modified forms thereof as come within the scope of the following claims.

I claim:

1. A twin-sheet thermoforming apparatus comprising:
   a) a frame;
   b) an upper mold mounted for vertical movement on the frame;
   c) a platen mounted beneath the upper mold;
   d) a lower mold mounted to the platen;
   e) a plurality of hydraulic actuators mounted to the platen and acting on the lower mold, wherein each actuator has an extensible piston for vertically displacing the lower mold;
   f) a sensor mounted to each actuator for determining the position of the piston;
   g) a controller means for controlling the application of pressurized hydraulic fluid to the hydraulic actuators, wherein the controller means is connected in data receiving relationship to receive piston position information from the sensors, and wherein the controller means performs the additional function of controlling the actuators to uniformly advance the lower mold to drive a first means for forming a molded thermoplastic sheet on the lower mold into engagement with a second means for forming a molded thermoplastic sheet on the upper mold and thereby minimize deflection of the lower mold, the upper mold being separated from the lower mold by the intervening first means and the second means; and
   h) means for supplying precise quantities of hydraulic fluid including hydraulic pumps and each pump is controlled by the controller means, the pumps being incrementable by the controller means to cause a precise and repeatable advancement of the connected actuator.

2. The apparatus of claim 1 wherein the sensors comprise linear variable displacement transducers.

3. The apparatus of claim 1 further comprising:
   a) a plurality of gear posts extending vertically from the frame;
   b) a drive mounted to the lower platen;
   c) a plurality of gears driven by the drive to engage the gear posts and advance the lower platen in a vertical direction.

4. A twin-sheet rotary thermoforming apparatus comprising:
   a) a frame defining at least three stations including a first heating station, a second heating station, and a forming station;
   b) an upper carrousel mounted to the frame and having at least three stations with retainers for retaining a sheet of thermoplastic in each of the station;
   c) a lower carrousel mounted to the frame and mounted coaxial with the upper carrousel and having at least three lower stations with retainers for retaining a sheet of thermoplastic in each station;
   d) wherein the forming station includes an upper mold and a lower mold, the lower mold being mounted on a rigid member, the rigid member being supported on a plurality of hydraulic actuators for moving the lower mold towards the upper mold in parallel spaced relation;
   e) a controller means for controlling the plurality of actuators in response to signals transmitted by sensors on said actuators, the sensors measuring position, the means for controlling functioning to bring the lower mold into closer proximity to the upper mold, and to close the upper mold on the lower mold with a first means for forming a twin-sheet thermoformed object positioned within the upper mold and a second means for forming a twin-sheet thermoformed object positioned within the lower mold such that the first means fuses at selected locations to the second means, the upper mold remaining substantially separated from the lower mold by the intervening first and second means; and
   f) means for supplying precise quantities of hydraulic fluid including hydraulic gear pumps and each gear pump is controlled by the controller means, the gear pumps being incrementable by the controller means to cause a precise and repeatable advancement of the connected actuator.

5. The apparatus of claim 4 further comprising:
   a) a platen mounted beneath and in supporting engagement with the plurality of hydraulic actuators; and
   b) a plurality of posts extending vertically from the frame, wherein the platen is mounted to the posts for vertical movement thereon in spaced relation to the upper mold.

6. The apparatus of claim 4 wherein the frame includes at least four stations including a load and unload station.

* * * * *